(12) United States Patent
Fujii et al.

(10) Patent No.: US 6,452,899 B1
(45) Date of Patent: Sep. 17, 2002

(54) OPTICAL INFORMATION MEDIUM AND RECORDING METHOD THEREFOR

(75) Inventors: Toru Fujii; Toshiaki Tajima; Yuji Tomizawa; Ryou Negishi; Emiko Hamada, all of Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 09/340,212

(22) Filed: Jun. 25, 1999

(30) Foreign Application Priority Data

Jul. 8, 1998 (JP) .......................................... 10-192771

(51) Int. Cl.$^7$ ................................................ G11B 7/24
(52) U.S. Cl. ..................................... 369/275.4; 428/64.4
(58) Field of Search ........................... 369/275.4, 275.1, 369/275.3, 277, 279, 283, 275.2, 275.5; 428/64.4, 64.1, 64.5, 64.6, 64.9

(56) References Cited

U.S. PATENT DOCUMENTS

| | | | |
|---|---|---|---|
| 5,148,421 A | * 9/1992 | Satoh et al. | 369/44.23 |
| 6,040,030 A | * 3/2000 | Utsunomiya et al. | 428/64.1 |
| 6,071,588 A | * 6/2000 | Nobumasa et al. | 428/64.4 |
| 6,128,271 A | * 10/2000 | Ohta | 369/275.4 |
| 6,229,785 B1 | * 5/2001 | Kitaura et al. | 369/275.4 |

* cited by examiner

*Primary Examiner*—Ali Neyzari
(74) *Attorney, Agent, or Firm*—Flynn, Thiel, Boutell & Tanis, P.C.

(57) ABSTRACT

An optical information medium, comprising: a transparent substrate for penetrating a recording laser beam therethrough; a recording layer being formed on the transparent substrate; and a reflective layer being formed on the recording layer and for reflecting reproducing laser beam thereupon. A numerical aperture of an objective lens of an optical pickup for irradiating the recording laser beam on the recording layer is approximately 0.65, and the numerical aperture of an objective lens of the optical pickup for irradiating the recording laser beam on the reflection layer is approximately 0.60. An inclination angle θ at both edges of the groove for tracking, being formed spiral-like on the surface of the transparent substrate on which the recording layer is formed, with respect to the main surface of the transparent substrate is selected from 55° to 75°. An index α, being expressed by 1−Dr/Ds when assuming that depth of the groove on the transparent substrate is Ds and depth of the recording layer at position of said groove is Dr, is selected from 0.2 to 0.4. Further, full width at half maximum of the groove on the transparent substrate is selected to be from one-third (⅓) to a half (½) of the pitch p of the groove. With this optical information medium, it is possible to record high density signals as signals being readable optically, as well as to record them with stability.

8 Claims, 2 Drawing Sheets

OPTICAL INFORMATION MEDIUM AND RECORDING METHOD THEREFOR

BACKGROUND OF THE INVENTION

1. Field of the Invention

The present invention relates to an optical information medium, on which can be recorded information being optically reproducible, and a recording method for recording signals being optically readable, and in particular relates to the optical information medium and the recording method, for realizing a recording/reproducing system being suitable for a high density recording medium on which the information can be recorded and reproduced with red color laser beam of short wavelength from 630 nm to 670 nm.

2. Description of Related Art

With the recent advances in development and application of a short wavelength laser, standardization is proceeded on the standard for DVDs (Digital Versatile Discs) which enables recording and reproducing with high density, as well as the practical application thereof The DVD has a data area at least provided on one surface of the substrate thereof, so as to form so-called pits as a means for information thereon, and a reflection layer made of metal film which is formed on that data recording area.

For the DVDs, a different standard for high density is determined, comparing to the standard for the optical information medium being the most general or popular now, such as a CD (Compact Disc). For example, with the optical pickup, it is determined to use the red color laser of short wavelength from 630 nm to 670 nm, and to use an objective lens of high numerical aperture (NA), such as of 0.6 in NA, etc. Accompanying to this, for dealing with a disc tilt, the thickness thereof is determined 0.6 mm, to be about half (½) of that of the CD. However, for maintain compatibility or interchangability in sizes between the CD having thickness of 1.2 mm, the disc of DVDs applies such structure that two pieces of discs are filed up and bonded together. According to the DVD standard, it is standardized that one layer of the disc has recording capacity of 4.7 GB at the maximum, in average thereof, i.e., video and audio information for 133 minutes long.

In the standardization of the DVD standard, in the similar manner of the relationship between the CD-ROM and CD-R or CD-RW, at the beginning were assumed both an optical information medium for use of reproduction exclusively (for reproduction only) and an optical information medium being recordable. However, the standardization at the beginning was made only on a DVD-Video for video and on a DVD for reproduction only, such as DVD-ROM which is targeted for recording computer data, but the standardization on the recordale DVD was postponed. Under such the situation is desired development of an optical information medium, on which recording is possible with high density at the maximum recording capacity of 4.7 GB on one layer of the disc.

With such the DVD, i.e., the high density recording medium as mentioned in the above, the recording is performed with high density, with a tracking pitch 0.74 μm and the minimal pit size 0.4 μm (0.44 μm in case of double layer recording), comparing to the tracking pitch 1.6 μm and the minimal pit size 0.83 μm in the CD. A means for enabling the reproduction with the pits of such the high density is the use of red color laser of short wavelength from 630 nm to 670 nm and the use of objective lens of high numerical aperture (NA), such as of 0.6 in NA, as mentioned in the above.

On the surface of the substrate of such the recordable DVDs, a groove of such the pitch 0.74 μm as mentioned above is formed for tracking, and on the surface of the substrate having that groove is provided a recording layer including organic dye. And, further on the organic dye is provided a reflection layer, such as of Au, Ag or Al, etc. For recording signals on that recordable DVD, there is a necessity to radiate a recording laser beam upon the recording layer mentioned above, so as to form the pits of various sizes, including the minimum size of 0.4 μm. For that purpose, the red color laser of short wavelength from 630 nm to 670 nm is used, and the beam spot thereof must be focused onto a very narrow region to perform the recording.

SUMMARY OF THE INVENTION

A first object, in accordance with the present invention, for dissolving the drawbacks in the technology for performing record on the optical information medium corresponding to such the high density recording, is to provide a recording method for an optical information medium, being able to record optically readable signals with high density. A second object, in accordance with the present invention, is to provide an optical information medium which enables stable recording of the signals, thereby easily obtaining the reproduction signal satisfying the standard determined in relation to the high density information medium, such as the DVD standard as mentioned above.

As mentioned previously, in a DVD player for reproducing from the high density recording medium, such as the DVD, which is standardized at the present time, the numerical aperture (NA) of the objective lens of the optical pickup is 0.6, for radiating reproduction laser beam. The larger the aperture of the objective lens in the optical pickup, other words, the larger the NA of the objective lens, the smaller the beam spot can be focused upon the optical information medium, thereby enabling reproduction with high density.

In the similar manner, also when recording onto the optical information medium, the larger the NA of the objective lens for radiating the recording laser beam, the smaller the beam spot of the recording laser beam can be radiated upon the optical information medium, thereby enabling recording with high density.

However, when the NA of the objective lens is large, the focus point is likely to shift due to the inclination of the disc to an optical axis of the objective lens caused by the curvature of discs, therefore, there may easily occur a problem, such as deterioration in deviation of pit-and-land length, accompanying with the worth in balance between or among the pits of various length, including long and short ones which are formed through the recording operation. Accordingly, in accordance with the present invention, first of all, the NA of the objective lens in the optical pickup when recording is larger than that when reproducing. Second, for enabling stable recording of signals even under the condition where the objective lens (o) having a large NA, an index α for film thickness of land/groove of said recording layer, being expressed by 1−Dr/Ds when assuming that depth of said groove is Ds and depth of said recording layer at position of said groove is Dr, and width of the groove 3 are selected, appropriately.

Namely, according to the present invention, there is provided a recording method for an optical information medium, comprising: a transparent substrate 1 for penetrating a recording laser beam therethrough; a recording layer 12 being formed on said transparent substrate 1; and a reflective layer 13 being formed on said recording layer 12 for reflecting the reproducing laser beam thereupon, wherein, when enabling to record optically readable signals by means of the recording laser beam being incident from said transparent substrate 1, NA of an objective lens (o) of an optical pickup for irradiating the recording laser beam on said recording layer 12 is selected to be approximately 0.65, while NA of an objective lens of the optical pickup for irradiating the reproducing laser beam on said reflecting layer 13 is selected to be approximately 0.6.

In more details, the NA of the objective lens (o) of the optical pickup for irradiating the recording laser beam on said recording layer 12 is determined 0.65±0.02, and the NA of the objective lens of the optical pickup for irradiating the reproducing laser beam is determined 0.60±0.02. In this instance, the wavelength of the recording laser beam lies from 630 nm to 670 nm, in the same region of the wavelength of the reproducing laser beam.

With this recording method for the optical information medium, since the NA of the objective lens (o) of the optical pickup is selected approximately 0.65 being larger than the NA of 0.6 for the reproducing laser beam, the beam spot can be focused smaller when recording. Therefore, the recording power can be focused into a spot being smaller in the beam diameter than in the conventional art.

On the other hand as mentioned in the above, when the NA of the objective lens is large, the focus point is likely to shift due to the inclination of the disc to an optical axis of the objective lens caused by the tilt of discs, therefore, there may easily occur a problem, such as deterioration in deviation of pit-and-land length, accompanying with the worth in balance between or among the pits of various lengths, which are formed through the recording.

Then, according to the present invention, an inclination angle at both side of said groove with respect to the recording laser beam incident surface which is main surface of said transparent substrate is selected from 55° to 75°. With this, even with the beam which is focused by the objective lens (o) with large NA, because of accurate tracking and increase in contrast due to light interference at the pit edge portion when recording, the modulation amplitude of all the long and short pits are optimized.

For enabling the accurate tracking and the recording corresponding to the DVD standard under the condition where the NA of the objective lens (o) is 0.65±0.02, the inclination angle $\theta$ must be equal to or greater than 55°, and the larger the better, under the condition that the transparent substrate 1 has thickness of 0.6±0.02 mm and has a spiral groove 3 for tracking at pitch 0.74±0.01 $\mu$m, being formed on the surface on which the recording layer 12 is formed. However, if the inclination angle of the groove 3 exceeds 75°, the transparent substrate 1 has difficulty in removal thereof from a mold when being produced by a method of injection mold, thereby bringing about remarkable decrease in quality of the product and deterioration in productivity thereof. Therefore, the inclination angle $\theta$ must be determined not to exceed 75°.

Further, when assuming that depth of the groove 3 on the transparent substrate 1 is Ds and depth of the recording layer at position of said groove is Dr, the index $\alpha$ for film thickness of land/groove, being expressed by 1−Dr/Ds, is selected from 0.2 to 0.4. This index $\alpha$=1−Dr/Ds for film thickness of land/groove indicates degree of leveling of the recording layer 12 when the recording layer 12 is formed by applying the organic dye on the transparent substrate having the groove 3 for tracking, by means of the spin coating method. The value of this film thickness index $\alpha$ indicates that the ratio between the depth of the groove on surface of the recording layer 12 and the depth of the groove 3 on surface of the transparent substrate 1 comes to be larger as the result of proceed or advance of the leveling on the recording layer.

This film thickness index $\alpha$ is preferable to be small from view point of the modulation amplitude which is obtained when being reproduced after recording. For obtaining the higher modulation amplitude with aiming the DVD standard, under the condition that the NA of the objective lens (o) is 0.65±0.02 when recording and the NA of the objective lens (o) is 0.6±0.02 when reproducing, the index $\alpha$ must be equal to or less than 0.4 ($\alpha \leq 0.4$).

On the other hand, if this index $\alpha$=1−Dr/Ds is too small, as a result of small degree in the leveling, the concave/convex of the reflection layer 13 comes to be large, thereby reducing the reflectivity. For obtaining high reflectivity, with aiming the reflectivity being equal to or greater than 45% being determined in the DVD standard, the index $\alpha$ is selected to be equal or greater than 0.2 ($\alpha \geq 0.2$).

Further, full width at half maximum (FWHM) of the groove 3 on the transparent substrate 1 is selected from one-third (⅓) to a half (½) of the pitch p of the groove 3. The FWHM of the groove 3 means the width of the groove at the position where the depth Ds is a half (½) of the depth Ds of the groove 3 which is formed on the transparent substrate 1. When the NA of the objective lens (o) is set to be 0.65±0.02 when recording, although previously mentioning that the beam spot of the recording laser beam can be made smaller, however if the FWHM of the groove 3 is widen to exceed a half (½) of the pitch p (0.74 $\mu$m) of the groove 3, no effect can be obtained by focusing the recording laser beam to the beam spot. On the other hand, if the FWHM of the groove 3 is narrowed so as not to reach to one-third (⅓) of the groove 3, sufficient modulation amplitude cannot be obtained when reproducing by selecting the NA of the objective lens (o) to be approximately 0.60±0.02.

According to the present invention, when recording signals onto the optical information medium with meeting the high density recording, it is possible to perform recording while focusing the recording laser beam into a small region or spot, by means of the optical pickup having the objective lens (o) of the NA 0.65±0.02 being larger than the NA 0.60±0.02 of the objective lens for reproducing, thereby enabling to cope with recording with high density. Moreover, the drawbacks which are likely to occur accompanying with enlargement in the NA of the objective lens (o) in the optical pickup can be dissolved, by selecting the inclination angle of both sides of the groove for tracking on the transparent substrate of the optical information medium, the ratio between the width and pitch of the groove, or the index for film thickness of land/groove of the recording layer, appropriately. With this, it is possible to obtain reproduced signals which satisfy the requirements determined for the high density optical information medium, such as the DVD standard, with ease.

DESCRIPTION OF THE PREFERRED EMBODIMENTS

Hereinafter, detailed explanation of the embodiments according to the present invention will be given by referring to attached drawings.

Figure 1:
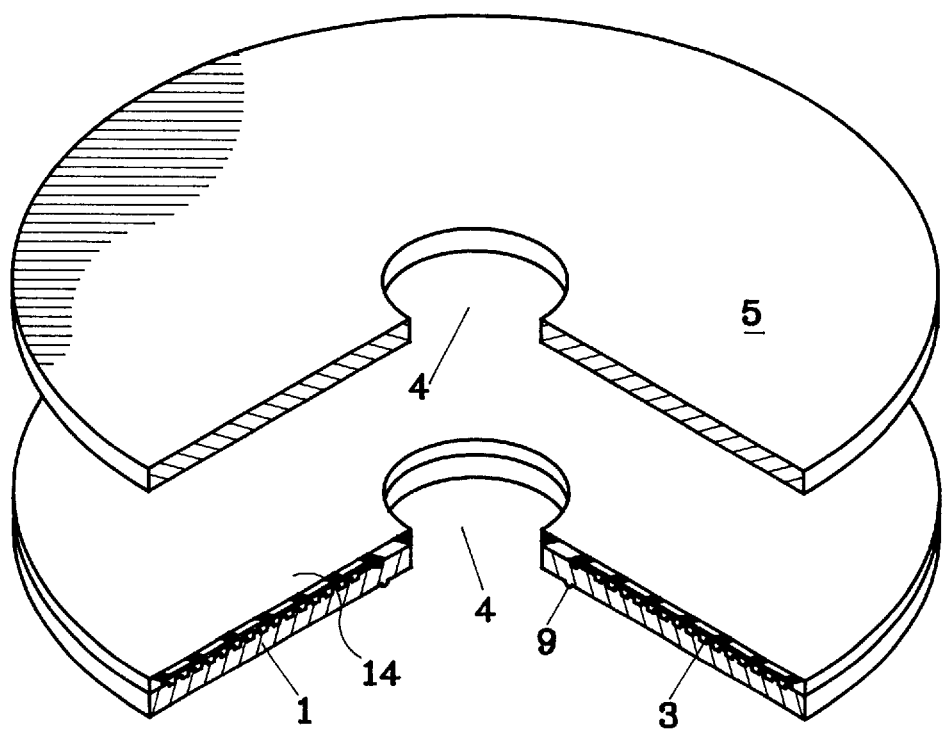
FIG. 1 is an exploded perspective view of two pieces of substrates in an example of an optical information medium according to the present invention, under a condition before they are bonded together, including a partial cross-section view thereof.
Figure 2:
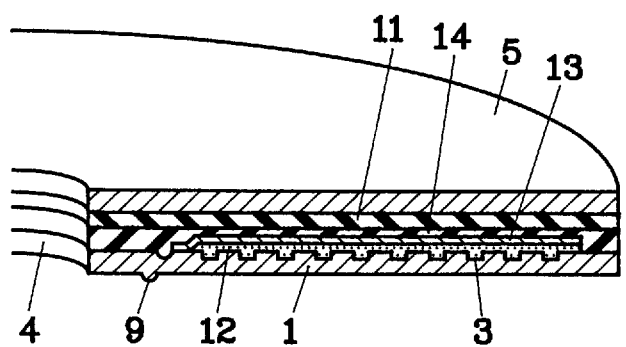
FIG. 2 is a perspective view including a partial cross-section view of the optical information medium after being bonded together.

A write once optical information medium is shown in FIGS. 1 and 2, which is on bonded both surfaces and is recordable and reproducible from the one surface thereof, as an example of the optical information medium according to the present invention.

A transparent substrate 1 is made from a substrate of a disc-like shape, having a center hole 1 in the central portion thereof This transparent substrate 1 is most preferably to be made of transparent resin, such as polycarbonate, polymethyl metacrylate (PMMA), etc.

On the one surface of the substrate 1 having the transparency, and in an outside of the above-mentioned center hole 4, there is provided a clamping area which will be mentioned later, and the outside thereof forms a data recording area or region. In the data recording area of the transparent substrate 1 is formed a spiral-like groove 3 for tracking. The pitch of the groove 3 for tracking is 0.74 μm at the standard.

Further, on the portion of the main surface of the data recording area is formed or coated a recording layer 12. The recording layer 12 is formed, for example, by applying or coating organic dye by means of a spin coat method or the like. Furthermore, on the recording layer 12 is formed a reflection film 13 made of metal film of gold, aluminum, silver, copper or an alloy thereof. On the reflection layer 13 is formed a protection film 14, such as of ultraviolet ray curable resin.

Moreover, the other piece of substrate 5 is prepared other than the transparent substrate 1. This substrate 5 is made of the same material as the transparent substrate 1, as well as has the same sizes, however, is not provided with such the groove 2, the recording layer 12 and the reflection layer on the main surface thereof, as be provided on the transparent substrate 1 mentioned above. Of course, otherwise, the other substrate 5 may be provided with the groove 3, the recording layer 12 and the reflection layer 13, in the similar manner of the transparent substitute 1 mentioned above.

Next, those two pieces of substrates 1 and 5 are filed up and pasted together. For example, reactive curable resin is applied or coated on the main surface of at least one of those two pieces of substrates 1 and 5 as adhesive, by means of spin coating method or the like, and is hardened after they are piled up and bonded together opposing those surfaces to each other. In this manner, those two pieces of substrates 1 and 5 are bonded together upon the main surfaces thereof, with adhesive layer 11 formed by hardening the above-mentioned reactive curable resin. In this instance, the transparent substrate 1 is adhered on the surface, on which the recording layer 12 and the reflective layer 13 are formed.

In the example mentioned above, on the transparent substrate 1 having the recording layer 12 and the reflection layer 13 on the surface thereof formed with the groove 3, is bonded the other substrate 5 having no such the recording layer 12 and the reflection layer 13 thereon. In this instance, the recording and/or reproducing is able only on one side surface thereof The other substrate 5 may have no transparency, or be colored for maintaining a durability against light, or have a region on the surface, where letters or patterns can be written in.

On the other hand, preparing two pieces of the transparent substrates 1, each having the recording layer 12 and the reflection layer 13 on the surface thereof formed with the groove 3, it is also possible to bond them together opposing the recording layer 12 and the reflection layer 13 to each other, so as to obtain an optical information medium, with which the recording and/or reproducing can be performed on both surfaces thereof.

However, in FIGS. 1 and 2, a reference numeral 9 indicates a ring-like convex formed in an outside of the data recording area on the side surface of the transparent substrate 1, upon which the recording laser beam is incident. This is for the purpose of protecting the recording surface of the optical information medium from touching with the surface of other one, when the plurality of the optical information media are filed up.

Figure 3:
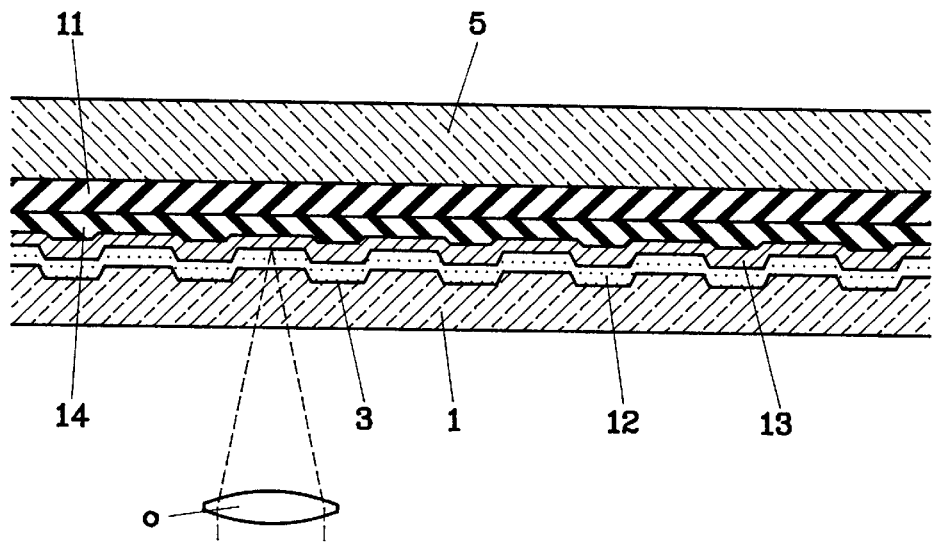
FIG. 3 is a vertical side cross-section view of showing a principle portion of a recording region of the optical information medium.
Figure 4:
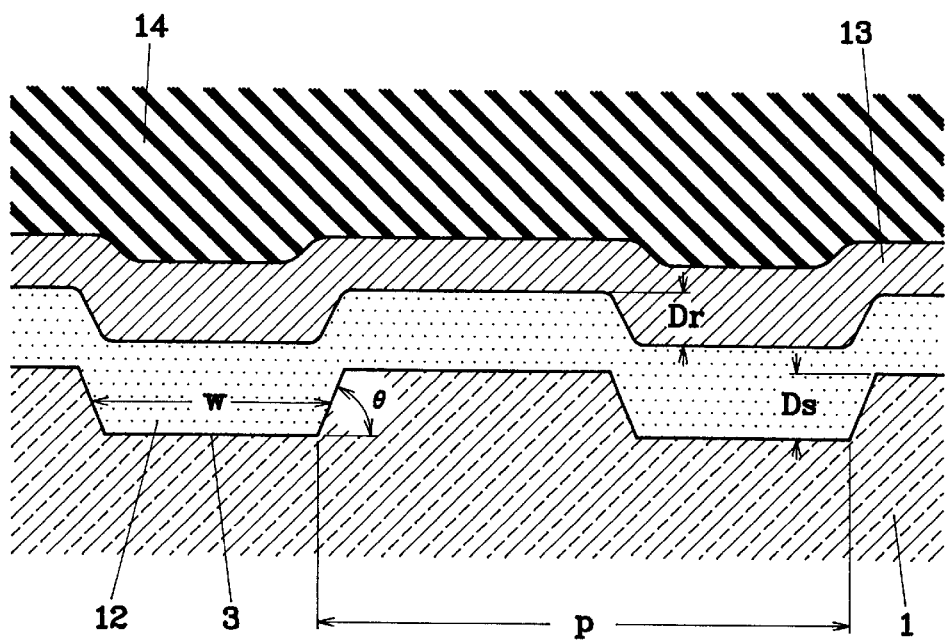
FIG. 4 is an enlarged vertical side cross-section view of showing the principle portion of the recording region of the optical information medium, with sizes and angles thereof.

FIG. 3 is a vertical cross-section view of showing a principle portion, in particular, a portion of a recording area of the optical information medium, where the above-mentioned recording layer 12 and the reflection layer 13 are formed. FIG. 4 shows an enlarged cross-section view of the portion of those recording layer 12 and the reflection layer 13, further in details thereof.

As shown in FIG. 4, the spiral-like groove 3 for tracking is provided on the surface of the transparent substrate 1, on which side the recording layer 12 is formed, wherein an inclination angle θ at the both edges of groove with respect to the surface of the transparent substrate 1 through which the recording laser beam penetrates, is selected from 55° to 75°.

Further, an index α for film thickness of land/groove of the recording layer, which can be expressed by 1−Dr/Ds when assuming that the depth of the groove 3 on the transparent substrate 1 is Ds and the depth of the recording layer 12 at position of this groove 3 is Dr, is selected from 0.2 to 0.4. This index α=1−Dr/Ds for film thickness of land/groove of the recording layer indicates a degree of leveling of the recording layer 12, when applying it by coating organic dye on the transparent substrate 1 having the groove 3 for tracking, by means of the spin coating thereof. The larger the numerical value, the more the leveling proceeds. Namely, it indicates that the ratio between the depth of the groove on the surface of the recording layer 12 and the depth of the groove 3 on the surface of the transparent substrate 1 is large.

Also FWHM of the groove 3 on the transparent substrate 1 is selected to be from one-third (⅓) to a half (½) of pitch p of the groove 3. The FWHM of the groove 3 means the width of the groove 3 at the position where the depth is a half (½) of the depth Ds of the groove 3 formed on the transparent substrate 1.

With respect to such the optical information medium, the beam of the recording laser beam, from the side of the above-mentioned transparent substrate 1, is focused onto the recording layer 12 so as to perform the recording of signals, by determining the NA of the objective lens (o) at 0.65±0.02. As was mentioned previously, by making the NA of the objective lens (o) in the optical pickup when recording 0.65±0.02, being larger than NA=0.60 of the objective lens when reproducing, it is possible to focus the spot of the recording laser beam smaller. Thereby, it is possible to obtain the recording with high density.

Next, examples of the present invention will be explained by referring concrete numerical values thereof.

EXAMPLE 1

A transparent substrate 1 having the groove 3 for tracking on the one side of the main surfaces, being 0.31 μm in the FWHM, 140 nm in the depth, 65° in the inclination angle at both edges of groove, and 0.74 μm in the pitch, is prepared from a polycarbonate substrate of 120 mmψ in an outer diameter, 15 mmψ in an inner diameter, 0.597 mm in a thickness, and 1.59 in a refractive index.

On the side surface of the transparent substrate 1, having the groove 3 thereon, the recording layer 12 is formed by the spin coating film formation of a solution of cyanine dye (trimethylene dye).

The depth in position of the groove 3 mentioned above is 105 nm in the recording layer 12, and the index for film thickness of land/groove of the recording layer is $\alpha=1-Dr/Ds=0.25$. Also, the FWHM of the groove 3 is 0.31 μm as mentioned in the above, therefore it is approximately 42% of the pitch of the groove 3, i.e., 0.74 μm.

Further, Au is spattered onto the recording layer 12 so as to form the reflection layer 13 therewith. On this, ultraviolet ray curable resin (SD 211 of Dainippon Ink Chemical Industry Co., Ltd.) is coated by the spin coating and is hardened by irradiating the ultraviolet ray on it, so as to form the protection layer 14 therewith. On this protection layer 14, being applied with an adhesive of ultraviolet ray curable resin, the substrate is piled up and bonded together, which having the same material and sizes as that of the mentioned above but other than that it does not have the groove thereon. And, the ultraviolet ray is irradiated on the adhesive to harden it, thereby producing the optical information medium.

On the optical information medium produced in this manner, EFM-Plus signal (8–16 modulation signal) is recorded at recording power of 10 mW and with wavelength of 635 nm, with using the optical pickup having the objective lens (o) of NA 0.65. After being recorded thereon, the signal is reproduced ten (10) times, repeating the operations of loading and unloading through a DVD player having the optical pickup of NA 0.60, which is available on a market. No reading error of the signal occurs, and a stable reproduction can be achieved. The modulation amplitude of the recorded signal is 64%, the maximum value of lengths errors of the pit and land is 6.0 nsec for each signal, the jitter is 7.5% and the reflectivity is 65%, respectively, thereby obtaining good or preferable results.

EXAMPLE 2

The optical information medium is produced in the same manner to that of the example 1 mentioned above, but the groove 3 for tracking on the main surface of the transparent substrate 1 is determined to be 0.28 μm in the FWHM, 200 nm in the depth, and 57° in the inclination angle at both edges of grove thereof, although other than those are same as in the example 1 mentioned above.

The depth in position of the groove 3 mentioned above is 135 nm in the recording layer 12, and the index for film thickness of land/groove of the recording layer is $\alpha=1-Dr/Ds=0.33$. Also, the FWHM of the groove 3 is 0.28 μm as mentioned in the above, therefore it is approximately 39% of the pitch of the groove 3, i.e., 0.74 μm.

On the optical information medium produced in this manner, EFM-Plus signal is recorded at recording power of 12 mW and with wavelength of 655 nm, with using the optical pickup having the objective lens (o) of NA 0.66, in the same manner as on the example 1 mentioned above. After being recorded thereon, the signal is reproduced ten (10) times, repeating the operations of loading and unloading through the DVD player having the optical pickup of NA 0.60, which is available on a market. No reading error of the signal occurs, and a stable reproduction can be obtained. The modulation amplitude of the recorded signal is 75%, the maximum value of lengths errors of the pit and land is 5.0 nsec for each signal, the jitter is 6.7% and the reflectivity is 58%, respectively, thereby obtaining good or preferable results.

EXAMPLE 3

The optical information medium is produced in the same manner to that of the example 1 mentioned above, but the groove 3 for tracking on the main surface of the transparent substrate 1 is determined to be 0.35 μm in the FWHM, 200 nm in the depth, and 72° in the inclination angle at both edges of groove thereof, although other than those are same as in the example 1 mentioned above.

The depth in position of the groove 3 mentioned above is 125 nm in the recording layer 12, and the index for film thickness of land/groove of the recording layer is $\alpha=1-Dr/Ds=0.38$. Also, the FWHM of the groove 3 is 0.35 μm as mentioned in the above, therefore it is approximately 47% of the pitch of the groove 3, i.e., 0.74 μm.

On the optical information medium produced in this manner, EFM-Plus signal is recorded at recording power of 10 mW and with wavelength of 635 nm, with using the optical pickup having the objective lens (o) of NA 0.64, in the same manner as on the example 1. After being recorded thereon, the signal is reproduced ten (10) times, repeating the operations of loading and unloading through the DVD player having the optical pickup of NA 0.60, which is available on a market. No reading error of the signal occurs, and a stable reproduction can be achieved. The modulation amplitude of the recorded signal is 75%, the maximum value of lengths errors of the pit and land is 5.0 nsec for each signal, the jitter is 6.7% and the reflectivity is 63%, respectively, thereby obtaining good or preferable results.

Comparison 1

The optical information medium is produced in the same manner to that of the example 1 mentioned above, but the groove 3 for tracking on the main surface of the transparent substrate 1 is determined to be 45° in the inclination angle at both side surfaces thereof, although other than those are same as in the example 1 mentioned above.

The depth in position of the groove 3 mentioned above is 95 nm in the recording layer 12, and the index for film thickness of land/groove of the recording layer is $\alpha=1-Dr/Ds=0.32$. Also, the FWHM of the groove 3 is 0.31 μm as mentioned in the above, therefore it is approximately 42% of the pitch of the groove 3, i.e., 0.74 μm.

On the optical information medium produced in this manner, EFM-Plus signal is recorded at recording power of 10 mW and with wavelength of 635 nm, with using the optical pickup having the objective lens (o) of NA 0.65, in the same manner as on the example 1. After being recorded thereon, the signal is reproduced ten (10) times, repeating the operations of loading and unloading through the DVD player having the optical pickup of NA 0.60, which is available on a market. However, the recorded signal can be reproduced only in seven (7) times among the totally ten (10) times trials in reproduction thereof. The modulation amplitude of the recorded signal is 54%, the maximum value of lengths errors of the pit and land is 18.0 nsec for each signal, the jitter is 10.5% and the reflectivity is 60%, respectively.

Comparison 2

The optical information medium is produced in the same manner to that of the example 1 mentioned above, but the groove 3 for tracking on the main surface of the transparent substrate 1 is determined to be 0.41 μm in the FWHM and 45° in the inclination angle at both side surfaces thereof, although other than those are same as the example 1 mentioned above.

The depth in position of the groove 3 mentioned above is 80 nm in the recording layer 12, and the index for film thickness of land/groove of the recording layer is α=1−Dr/Ds=0.43. Also, the FWHM of the groove 3 is 0.41 μm as mentioned in the above, therefore it is approximately 55% of the pitch of the groove 3, i.e., 0.74 μm.

On the optical information medium produced in this manner, EFM-Plus signal is recorded at recording power of 14 mW and with wavelength of 655 nm, with using the optical pickup having the objective lens (o) of NA 0.66, in the same manner as on the example 1. After being recorded thereon, the signal is reproduced ten (10) times, repeating the operations of loading and unloading through the DVD player having the optical pickup of NA 0.60, which is available on a market. However, no time can be reproduced the recorded signal since the signal balance is bad as a whole. The modulation amplitude of the recorded signal is 54%, the maximum value of lengths errors of the pit and land is 20.0 nsec for each signal, the jitter is 16.5% and the reflectivity is 48%, respectively.

Comparison 3

The optical information medium is produced in the same manner to that of the example 1 mentioned above, but the groove 3 for tracking on the main surface of the transparent substrate 1 is determined to be 0.28 μm in the FWHM and 70° in the inclination angle at both side surfaces thereof, although other than those are same as in the example 1 mentioned above.

The depth in position of the groove 3 mentioned above is 115 nm in the recording layer 12, and the index for film thickness of land/groove of the recording layer is α=1−Dr/Ds=0.18. Also, the FWHM of the groove 3 is 0.28 μm as mentioned in the above, therefore it is approximately 37% of the pitch of the groove 3, i.e., 0.74 μm.

On the optical information medium produced in this manner, EFM-Plus signal is recorded at recording power of 10 mW and with wavelength of 635 nm, with using the optical pickup having the objective lens (o) of NA 0.64, in the same manner as on the example 1. After being recorded thereon, the signal is reproduced ten (10) times, repeating the operations of loading and unloading through the DVD player having the optical pickup of NA 0.60, which is available on a market. However, no time can be reproduced the recorded signal since the signal balance is bad as a whole. The modulation amplitude of the recorded signal is 63%, the maximum value of lengths errors of the pit and land is 19.0 nsec for each signal, the jitter is 14.5% and the reflectivity is 37%, respectively.

What is claimed is:

1. An optical information medium comprising:
    a transparent substrate for allowing recording and/or reproducing laser beams to penetrate therethrough;
    a recording layer formed on said transparent substrate and comprising a land portion and a groove portion; and
    a reflective layer formed on said recording layer for reflecting the recording and/or reproducing laser beams,
    wherein the transparent substrate has a thickness of 0.6±0.02 mm and a spiral groove formed therein has a pitch of 0.74±0.01 μm and side surfaces with an inclination angle of 55–75° with respect to a surface of the transparent substrate on which the recording and/or reproducing laser beams are incident.

2. An optical information medium comprising:
    a transparent substrate for allowing recording and/or reproducing laser beams to penetrate therethrough;
    a recording layer formed on said transparent substrate and comprising a land portion and a groove portion; and
    a reflective layer formed on said recording layer for reflecting the recording and/or reproducing laser beams,
    wherein the transparent substrate has a spiral groove formed therein and an index a of a film thickness of a land portion/groove portion of the recording layer, expressed by 1−Dr/Ds, is from 0.2–0.4, wherein Ds is the depth of the groove and Dr is the depth of the recording layer at said groove.

3. A recording method for an optical information medium comprising the steps of:
    providing a transparent substrate for allowing recording and/or reproducing laser beams to penetrate therethrough;
    forming a recording layer comprising a land portion and a groove portion on said transparent substrate; and
    irradiating the recording laser beam onto the recording layer using a lens having a numerical aperture of approximately 0.65,
    wherein the transparent substrate has a thickness of 0.6±0.02 mm and a spiral groove formed therein has a pitch of 0.74±0.01 μm and side surfaces with an inclination angle of 55–75° with respect to a surface of the transparent substrate on which the recording and/or reproducing laser beams are incident.

4. A recording method according to claim 3, additionally comprising the step of irradiating the reproducing laser beam onto the recording layer using a lens having a numerical aperture of approximately 0.6.

5. A recording method according to claim 3, wherein the numerical aperture of the lens irradiating the recording laser beam is 0.65±0.02.

6. A recording method according to claim 4, wherein the numerical aperture of the lens irradiating the reproducing laser beam is 0.6±0.02.

7. A recording method according to claim 3, wherein the recording laser beam has a wavelength of from 630–670 nm.

8. An optical information medium according to claim 1, wherein an annular protuberance is provided on the surface of the transparent substrate on which the recording and/or reproducing laser beams are incident.

* * * * *

UNITED STATES PATENT AND TRADEMARK OFFICE
CERTIFICATE OF CORRECTION

PATENT NO.   : 6,452,899 B1
DATED        : September 17, 2002
INVENTOR(S)  : Toru Fujii et al.

It is certified that error appears in the above-identified patent and that said Letters Patent is hereby corrected as shown below:

<u>Column 10,</u>
Line 23, replace "index a" with -- index α --.

Signed and Sealed this

Eighteenth Day of February, 2003

JAMES E. ROGAN
*Director of the United States Patent and Trademark Office*